Nov. 10, 1964 C. LAUXEN ETAL 3,156,398

TAPE HANDLING APPARATUS

Filed June 30, 1961

2 Sheets-Sheet 1

INVENTORS
CARL LAUXEN &
JOHN B. LONG, JR.
BY Morris Rabkin
ATTORNEY

Nov. 10, 1964 C. LAUXEN ETAL 3,156,398

TAPE HANDLING APPARATUS

Filed June 30, 1961 2 Sheets-Sheet 2

INVENTORS
CARL LAUXEN &
JOHN B. LONG, JR.

BY Morris A. Rabkin

ATTORNEY

United States Patent Office 3,156,398 Patented Nov. 10, 1964

3,156,398
TAPE HANDLING APPARATUS

Carl Lauxen, Haddonfield, and John B. Long, Jr., Westmont, N.J., assignors to Radio Corporation of America, a corporation of Delaware
Filed June 30, 1961, Ser. No. 121,154
7 Claims. (Cl. 226—97)

The present invention relates to an improved tape transport by means of which tape can be driven at very high speeds, and more particularly to improved fluid lubricated tape guides which are useful in such a tape transport.

The invention is especially adapted for use in a tape loop transport wherein a loop of magnetic record tape can be driven at very high speeds in the range of thousands of inches per second. Such tape loop transports are useful in memory devices for storage of large amounts of information. Another use for tape loop transports is in systems for delaying electrical signals. The term "tape," as used herein, is intended to designate any web member, strip, film or object which is adapted to be handled in accordance with the features of this invention.

Any stationary part which a tape contacts when it travels at very high speed can cause tape wear and damage. Fluid lubricated guides, fluid lubricated transducers and other fluid lubricated parts have been used to counteract the friction that is believed responsible for tape wear and damage. Air is often used as the fluid lubricating medium.

The tension in a tape may vary. Also, a tape may meander from its expected path. It is, therefore, difficult to establish a fluid lubricated bearing between a tape and a part surface which properly and reliably supports the tape as the tape passes over the part. It is desirable that the bearing consume a minimum amount of air or other fluid lubricating medium consistent with its function. The equipment which is used to supply the lubricating medium may then be smaller in size and lower in cost.

It is an object of the present invention to provide tape handling apparatus having improved fluid lubricating means which separates the tape from those stationary parts of the apparatus which might otherwise contact the tape.

It is a further object of the present invention to provide a tape transport having improved fluid lubricated tape guides which properly and reliably support and guide a tape without making contact therewith.

It is a still further object of the present invention to provide fluid lubricated bearings separating a tape and a part cooperating therewith, which bearings require a minimum amount of the lubricating fluid.

It is a still further object of the present invention to provide a tape transport capable of driving a tape at very high speeds and which is lower in cost than known tape transports capable of driving tape at similar speeds by virtue of improved fluid lubricated bearings which require less fluid than the bearings used in such known tape transports.

Briefly described, a tape transport having features of the present invention includes means for driving a tape along a prescribed path. The path may be defined by stationary parts, such as tape guides having surfaces which face the tape. A fluid lubricating medium, such as air, is supplied, under pressure, between the tape and the guide surfaces which face the tape to form what is termed a hydrostatic fluid bearing. A hydrostatic fluid bearing is one which is established by fluid from a source of pressurized fluid external to the bearing. The leading end of the guide surface, over which the tape passes as it enters the guide, is inclined at a small, acute angle with respect to the path of the tape. A hydrodynamic fluid bearing is formed between the tape and the guide surface as the tape passes the leading end of the guide surface. A hydrodynamic fluid bearing is one which is formed from the ambient fluid, such as the air, without sources of externally pressurized fluid. The fluid is entrained between surfaces which are moving at high relative speeds. Only a small amount of fluid is required to establish the hydrostatic bearing due to the creation of the hydrodynamic bearing in the leading end of the guide. Thus, the fluid consumption requirements of the guide are minimized.

Means may also be provided for supplying lubricating fluid at different pressures to different regions of the guide surface. Thus, in a tape guide having an arcuate guide surface, the pressure of the fluid supplied in the central region of the guide surface is preferably at relatively low pressure, while the fluid supplied at the trailing end of the guide surface, where the tape leaves the guide is at somewhat higher pressure. The pressure differential accommodates for the centrifugal force which acts on the tape in the central region of the guide. This force tends to lift the tape from the guide surface. Little added fluid is therefore required in the central region of the guide. Thus, the means for establishing different pressures in different parts of the guide provides for economy of fluid consumption in the guide.

The invention itself, both as to its organization and method of operation, as well as additional objects and advantages thereof, will become more readily apparent from a reading of the following description in connection with the accompanying drawings, in which.

Figure 1:
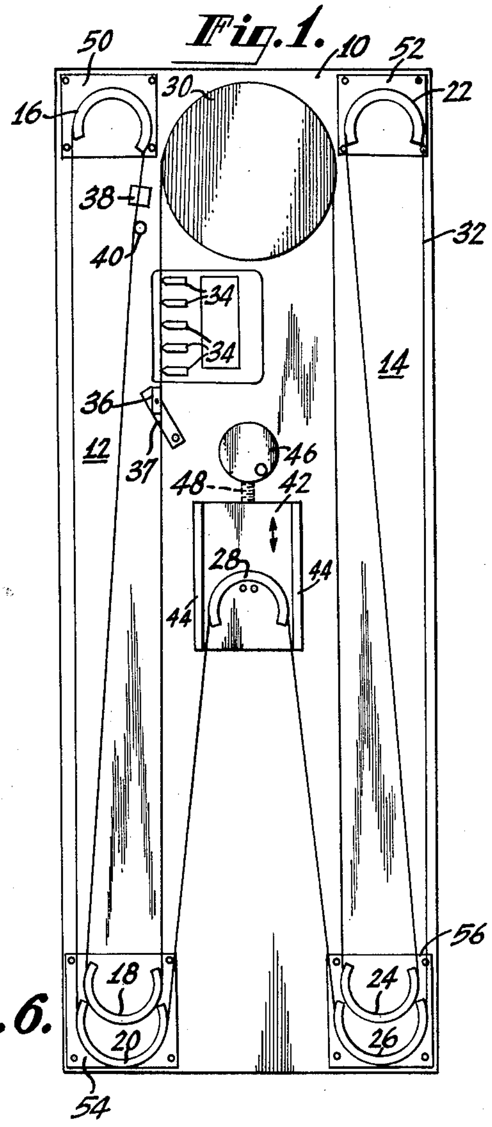
FIGURE 1 is a front view schematically illustrating a tape transport incorporating features of the invention.
Figure 2:
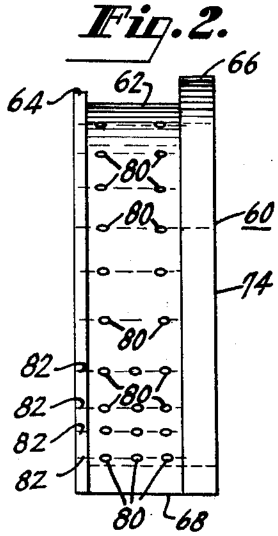
FIGURE 2 is an enlarged side view of one of the tape guides shown in FIG. 1.

Referring more particularly to FIG. 1, there is shown a panel 10 on which two sets of tape guides 12 and 14 are mounted. The first set of tape guides 12 includes an upper tape guide 16 and two lower tape guides 18 and 20. The upper tape guide 16 is in opposed relation to the lower tape guides 18 and 20. The second set of tape guides 14 includes an upper tape guide 22 and two lower tape guides 24 and 26. The lower tape guides 24 and 26 of the second set are in opposed relation to the second set upper tape guide 22. A vertically adjustable tape guide 28 is also mounted on the panel 10. A capstan 30 and the tape guides define the path of travel for an endless loop of tape 32. This tape 32 is a magnetic record tape of the type having a base film which is coated with retentive magnetic material. A plurality of magnetic heads 34 are disposed along the tape path for scanning the coated side of the tape 32. These heads may be connected to electronic apparatus for reading signals from and writing signals on the tape 32. A guide 36 carried at the end of an arm 37 pivotally mounted on the panel 10 is provided for guiding the tape into intimate contact with the heads 34. The arm 37 can be pivoted by a rotary solenoid mechanism (not shown) to advance the guide toward the tape. The tape is then deflected into contact with the heads. A magnetic erase head 38 is disposed near the upper guide 16. A guide 40 adjacent to the erase head 38 is provided for the purpose of accurately guiding the tape through the head 38. The guides 36 and 40 are preferably air guides adopted to project jets of air onto the tape. Such guides are well known.

The adjustable guide 28 is mounted on a slide plate 42. The slide plate 42 is adjustably mounted between two vertical, stationary, guide members 44. A hand wheel 46 is connected to the slide plate 42 by any suitable mechanism such as a feed screw arrangement 48. The plate 42 may be moved vertically by turning the wheel 46. This adjusts the tension in the loop of tape 32.

The upper guides 16 and 22 are fastened to plates 50 and 52, respectively. These plates 50 and 52 are screwed to the panel 10. The lower guides 18 and 20, and 24 and 26 are, respectively, mounted on plates 54 and 56. These plates 54 and 56 are also screwed to the panel 10. While only two sets 12 and 14 of opposed upper and lower guides are shown in FIG. 1, additional sets of guides may be used, if a longer length of tape is desired in the loop of tape 32. Desirably, these additional sets of guides are disposed symmetrically with respect to the capstan 30 and adjustable guide 28, as is the case with the guides of sets 12 and 14.

The capstan 30 is coupled to an electric motor. Alternatively, an air turbine motor may be used. The capstan 30 is rotated at a very high speed compared to the speeds of capstan rotation usually encountered in tape transports. For example, the capstan 30 may rotate at such speed that its peripheral speed is in excess of two thousand inches per second. At such speeds, the loop of tape would wear rapidly and be damaged where it contacts any stationary part of the tape transport. In order to prevent such damage, the tape is supported by fluid bearings which are established between the tape and the surface of every stationary part of the tape transport. Thus, jets of the lubricating fluid may emanate from the erase head guide 40 to float the tape over the guide 40. Fluid bearings are also provided at the surfaces of the guides 16, 18, 20, 22, 24, 26, and 28 of the two sets which might otherwise contact the tape. A suitable lubricating fluid is air.

Figure 6:
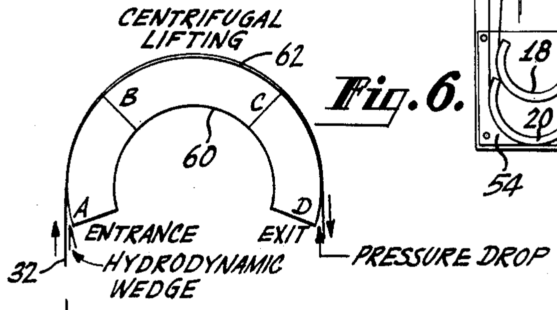
FIGURE 6 is a schematic view of the tape guide and a tape thereover showing, in exaggerated form and by way of illustration, the formation of air bearings between the surface of the guide and the tape.

An illustrative construction of a guide of either set is shown in detail in FIGS. 2 to 5, inclusive. The guide shown in these figures is an arcuate shaped guide member 60 having a circular tape guiding surface 62. This surface includes an arc of greater than 180°, and preferably an arc of 210°. Flanges 64 and 66 are formed along opposite edges of the tape guiding surface 62. The surface 62 may be considered as being divided into three parts, namely, a leading end, A—B, a central region B—C, and a trailing end C—D (FIG. 6). The tape 32 enters the guide at the leading end A—B, reverses its direction in the central region B—C, and leaves from the guide from the trailing end C—D. The path of the tape, as established by the disposition of the guides on the panel 10 (FIG. 1), is tangential to the surface 62 of the guide at a point approximately 15° from the edge 68 of the leading end of the guide. A wedge shaped area 69 is thus defined between the tape and the surface 62 of the guide. The angular disposition of the tape and the guide surface 62 provides for the establishment of a hydrodynamic air bearing, as will be explained more fully hereinafter. The tape also leaves the guide tangentially with respect to the surface 62 at a point near, but not quite at, the trailing edge 70 of the trailing end C—D.

A first slot or chamber 72 may be milled or otherwise machined into the guide member 60 from the rear side 74 thereof. This chamber is below the leading end A—B of the guide surface 62. Another slot or chamber 76 is machined in a manner similar to the chamber 72 into the guide member 60 from the rear side 74. This chamber 76 is below the central region B—C of the guiding surface 62. A third slot or chamber 78 is machined similarly to the chambers 72 and 76 into the member 60 from the rear side 74 thereof. This chamber 78 is below the trailing end C—D of the guiding surface 62. These chambers 72, 76, and 78, hereinafter referred to as manifolds, are sealed by the mounting plate (for example, the mounting plate 50 in FIG. 1) and provide separate first, second and third manifolds in the guide. The mounting plate is secured against the rear side 74 of the guide member 60 by screws. Blind, threaded holes 75 are provided in the member 60 for this purpose.

A plurality of orifices 80 are drilled or otherwise provided between manifolds 72, 76, and 78 and the guiding surface 62. These orifices serve to communicate the manifolds with the guiding surface and provide for the flow of pressurized air from the manifolds through the surface 62. This pressurized air establishes hydrostatic air bearings for supporting the tape, as will be explained more fully hereinafter. Different numbers of orifices extend through different parts or portions of the tape guiding surface 62. Thus, a larger number of orifices is provided between the first manifold 72 and the leading end A—B of the surface 62 than between the second manifold 76 and the central region B—C of the surface 66. The number of orifices 80 which extend from the third manifold 78 to the trailing end C—D of the surface 62 may equal the number of orifices 80 between the leading end A—B and the first manifold 72. The first four (4) rows 82 of orifices 80 starting from the edge 68 of the leading end A—B of the surface 62 may each have three orifices 80. The last four rows 84 of orifices nearest to the trailing edge 70 of the trailing end C—D may also have three orifices each. Two orifices may be included in each of the other rows of orifices 80 in the guide member 60. The first four rows 82 of orifices and the last four rows 84 of orifices may be closer to each other than the other rows of orifices. Thus, the number of orifices in the leading end A—B and in the trailing end C—D of the surface 62 is greater than the number of orifices in the central region B—C of the surface 62.

Separate pipes 86, 88 and 90 are fitted, respectively, into the manifolds 72, 76 and 78. These pipes may have threaded fittings which extend through the plate on which the guide members 60 are mounted. Each pipe 86, 88 and 90 is desirably connected to a source of pressurized air such as a compressor (not shown), through separate pressure regulating valves such that the air pressure is different in each of the manifolds. A suitable type of regulating valve is Type 20 AG–X3G manufactured and sold by the Norgren Company of Englewood, Colorado. Alternatively, the pipes 86, 88 and 90 may be connected to different sources of pressurized air, each of which provides air at the particular pressure desired in its associated manifolds.

Figure 7:
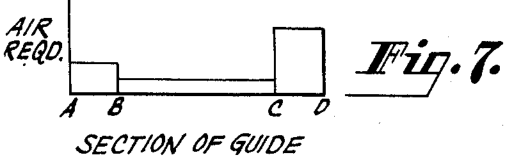
FIGURE 7 is a graph showing the air requirements of different regions of the guide shown in FIG. 6.
Figure 3:
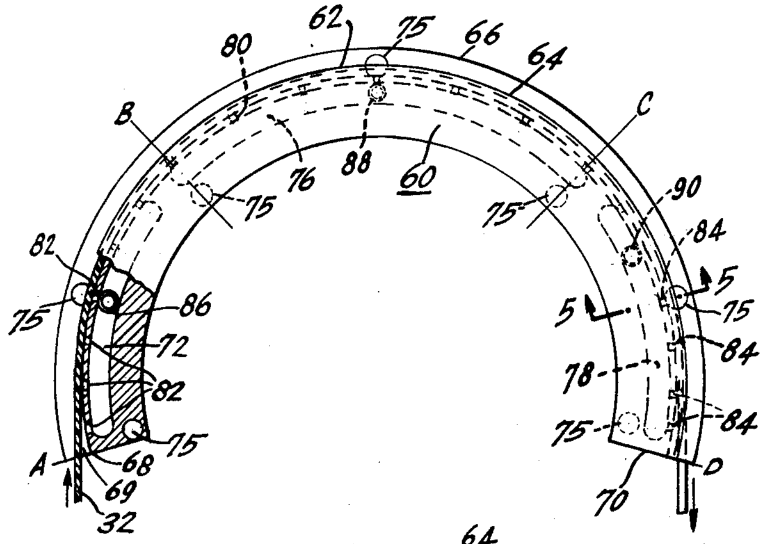
FIGURE 3 is a front elevation, partly in section, of the tape guide shown in FIG. 2.
Figure 4:
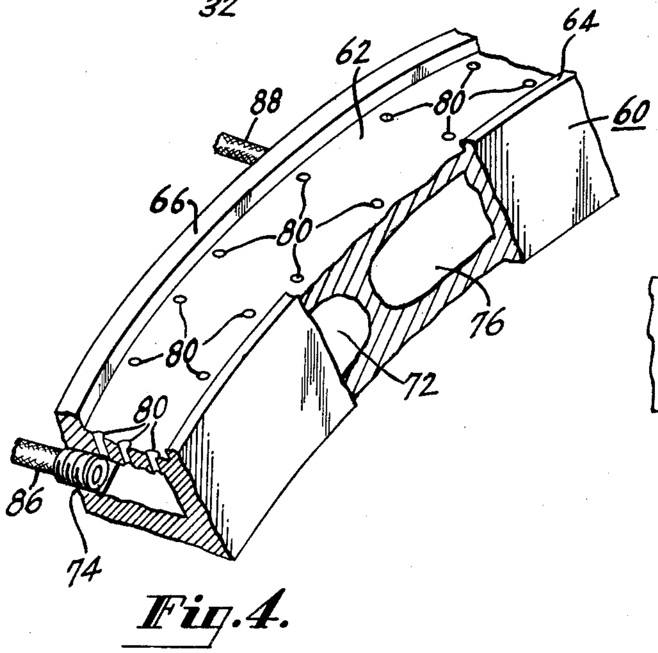
FIGURE 4 is an enlarged, fragmentary, perspective view of the tape guide shown in FIGS. 2 and 3.
Figure 5:
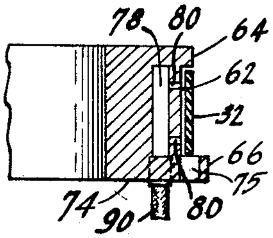
FIGURE 5 is a sectional view taken along the lines 5—5 of FIG. 3.

The manner in which the guide 60 supports and guides the tape 32 will be more apparent from FIGS. 6 and 7. The tape enters the guide at a small, acute angle with respect to the leading end A—B of the guiding surface 62. This angular relationship of the tape and guiding surface 62 exists because the leading end A—B of the guide extends beyond the point of tangency of the tape on the leading end A—B of the surface 62. A hydrodynamic air bearing, also known as a hydrodynamic wedge, is established between the tape 32 and the leading end A—B of the guiding surface 62. This air bearing is created since the rapidly moving tape entrains the ambient air and drives this air against the leading end A—B of the surface 62. An air cushion is thereby formed between the tape and the guiding surface 62 which supports, floats or lubricates the tape. The tape therefore does not contact the guiding surface initially.

When air from a source of pressurized air is introduced between the tape and the guiding surface 62, a cushion of air is formed therebetween. This cushion is referred to as a hydrostatic bearing. A hydrostatic air bearing is formed below each of the leading end A—B, the central region B—C, and the trailing end C—D of the guide surface 62. Only a small amount of air is required in the hydrostatic bearing in the leading end A—B of the surface 62, since the hydrodynamic air bearing is established in this leading end A—B of the surface. Thus, the amount of air required to establish the hydrostatic bearing in the leading end A—B is minimized.

Due to centrifugal force caused by its change of direction as it passes at high speeds over the central region B—C of the guiding surface 62, the tape has the tendency to lift itself off this central region. Accordingly, only a small amount of air is required to establish the requisite hydrostatic bearing in this central region B—C.

The tape tends to separate from the guide surface in the trailing end C—D in the guide surface 62. This separation causes a pressure drop in the region between the trailing end C—D and the tape. More air is therefore required to establish the requisite hydrostatic bearing in this trailing end C—D than the amount of air required in either the leading end A—B or the central region B—C.

FIG. 7 shows the amounts of air required in each section of the guide. The greatest amount of air is required in the trailing end C—D of the guide. Less air is required in the leading end A—B, and still less air is required in the central region C—B. The separate manifolds 72, 76 and 78 permit only the requisite amount of air to be provided in each section of the guide to space the tape from the guide throughout its path adjacent the guide. Accordingly, the air consumption in the guide is minimized.

From the foregoing description it will be apparent that there has been provided an improved tape transport having improved tape guides which utilize both hydrodynamic and hydrostatic fluid bearings for increased efficiency and reliability of tape guidance. While the invention has been described as being embodied in a tape loop transport, it will be appreciated that features of the invention are generally useful in the solution of tape guidance problems. Variations in the tape transport and in the tape guides described herein within the scope of the invention, will undoubtedly be apparent to those skilled in the art. For example, different arrangements of holes in the surface of the guides may be used. Conceivably each section of the guide may be an equal number of orifices 80 but these may be of different diameter. Accordingly, the foregoing description should be taken as illustrative and not in any limiting sense.

What is claimed is:

1. In tape handling apparatus a guide around which a tape is adapted to pass, which guide comprises a member having a circular surface including an arc of greater than 180°, said surface defining a path including an arc of approximately 180° around the central portion thereof, a wedge shaped area being defined between the leading end of said surface where said tape enters said guide and said tape, whereby to establish a hydrodynamic fluid bearing between said tape and said surface, a source of pressurized fluid, said member having a plurality of orifices distributed non-uniformly therein and extending through said circular surface thereo, the number of said orifices which are disposed around the center of said surface being relatively fewer than the number of said orifices disposed on each side of said center, and means for communicating said source and said orifices.

2. A tape guide for guiding a tape along a path comprising a member having a surface disposed along said path, means for supplying a pressurized fluid above atmospheric pressure between said surface and said tape, and means included in said last named means for supplying said fluid at relatively higher pressures above atmospheric pressure in the end regions of said surface and relatively lower pressures above atmospheric pressure in the central region of said surface.

3. A tape guide cooperative with a tape moveable along a prescribed path which comprises a member having a surface disposed along said path, said surface having a first region at which said tape enters said guide, a second region at which said tape changes its direction, and a third region from which said tape leaves said guide, and means for supplying pressurized fluid above atmospheric pressure between said tape and said surface at lesser pressure in said second region than in said first and third regions.

4. A tape guide cooperative with a tape moveable along a prescribed path which comprises a member having a surface disposed along said path, said surface having a first region at which said tape enters said guide, a second region at which said tape changes its direction, and a third region from which said tape leaves said guide, said member having first, second, and third chambers therein which respectively define first, second, and third manifolds for separately containing positively pressurized fluid, said member having a plurality of orifices communicating said first, second and third manifolds respectively with said first, second, and third regions, and means for supplying positively pressurized fluid to said first and third manifolds at relatively higher positive pressure than to said second manifold.

5. A tape guide for cooperation with a tape moveable at high speed, which guide comprises a member having a curved surface which defines a path for said tape, said surface having a leading end in which said tape enters said guide member, a central region in which said tape changes its direction of travel, and a trailing end from which said tape leaves said guide member, said path being spaced from and being tangential to said leading end to define a wedge shaped area between said tape and said leading end whereby to establish a hydrodynamic bearing between said tape and said surface when said tape enters said guide at high speed, said surface having a plurality of orifices therethrough, and means for supplying pressurized air above atmospheric pressure through those of said orifices in said central region at lesser pressures than through those of said orifices in said ends of said surface.

6. A guide around which a tape is adapted to pass, which guide comprises (*a*) a member having a circular surface over an arc of greater than 180°, (*b*) said surface defining a path of travel for said tape over an arc of approximately 180° disposed centrally around said surface, (*c*) said path of travel extending successively over a leading end of said surface, a central region of said surface, and a trailing end of said surface, and (*d*) means including manifolds in said member for providing hydrostatic air bearings of higher, above-atmospheric pressure between said tape and said leading and trailing ends of said surface than between said tape and said central region of said surface.

7. A guide around which a tape is adapted to pass, which guide comprises (*a*) a member having a circular surface over an arc of greater than 180°, (*b*) said surface defining a path of travel for said tape over an arc of approximately 180° disposed centrally around said surface, (*c*) said path of travel extending successively over a leading end of said surface, a central region of said surface and a trailing end of said surface, said member having (1) first, second, and third manifolds therein, and (2) first, second and third groups of orifices respectively extending from said first, second and third manifolds through said leading ends, central region and trailing end of said surface, and (*d*) means for providing pressurized air at different above-atmospheric pressures, higher in said first and third manifolds than in said second manifold.

References Cited in the file of this patent

UNITED STATES PATENTS

| | | |
|---|---|---|
| 1,971,853 | Ihlefeldt | Aug. 28, 1934 |
| 2,950,353 | Fomenko | Aug. 23, 1960 |
| 2,984,398 | Chalmers | May 16, 1961 |

FOREIGN PATENTS

| | | |
|---|---|---|
| 210,582 | Australia | Feb. 9, 1956 |
| 563,795 | Italy | June 4, 1957 |